May 23, 1939.                J. M. NICKELSEN                2,159,859
                                LINK OR STRUT
                             Filed May 9, 1938

INVENTOR.
John M. Nickelsen
BY
ATTORNEY.s

Patented May 23, 1939

2,159,859

UNITED STATES PATENT OFFICE 2,159,859

LINK OR STRUT

John M. Nickelsen, Ann Arbor, Mich., assignor to Monroe Auto Equipment Company, Monroe, Mich., a corporation of Michigan Application May 9, 1938, Serial No. 206,858

2 Claims. (Cl. 267—66)

This invention relates generally to connecting links or struts and refers more particularly to struts capable of being installed on motor vehicles to stabilize the action of the unsprung weight.

One of the principal objects of this invention is to improve generally connecting links or struts by providing a construction composed of a relatively few simple parts which lend themselves to inexpensive manufacture and cooperate to form a unitary assembly capable of standing considerable stress resulting from tension, compression, and torque.

A further object of this invention resides in the provision of a strut comprising an elongated tubular body having the opposite end portions flattened to form laterally spaced substantially parallel walls elongated in a direction extending transversely to the axis of the tube and having aligned openings therethrough in which bushings are anchored to provide for attaching the opposite ends of the strut to the parts it is desired to connect together.

The foregoing, as well as other objects, will be made more apparent as this description proceeds, especially when considered in connection with the accompanying drawing, wherein.

Figure 1:
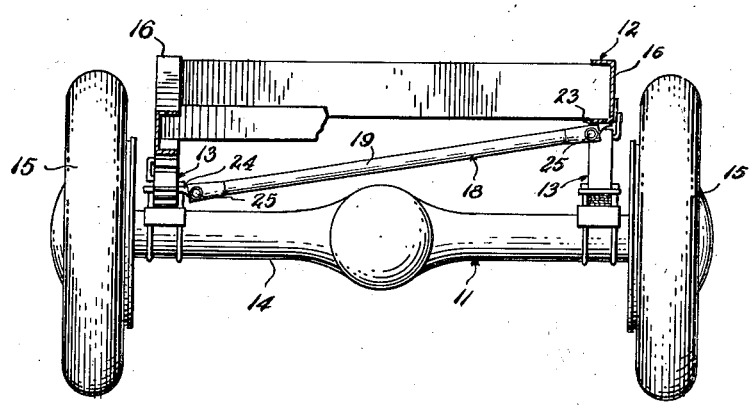
Figure 1 is a fragmentary and elevational view of a portion of the motor vehicle equipped with the stabilizing strut constructed in accordance with this invention.
Figure 2:
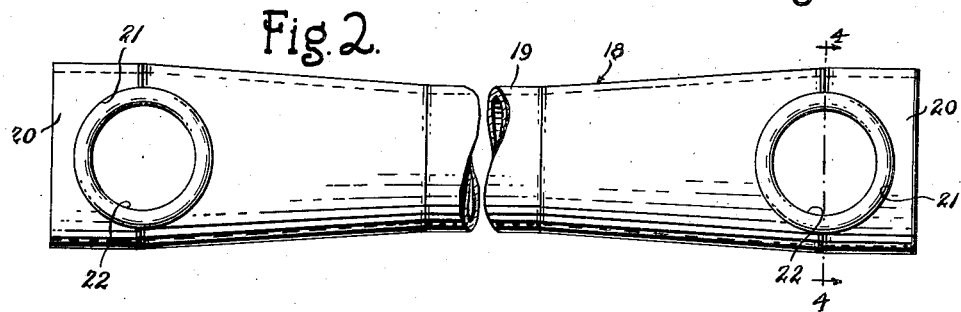
Figure 2 is a side elevational view of the strut shown in Figure 1.
Figure 3:
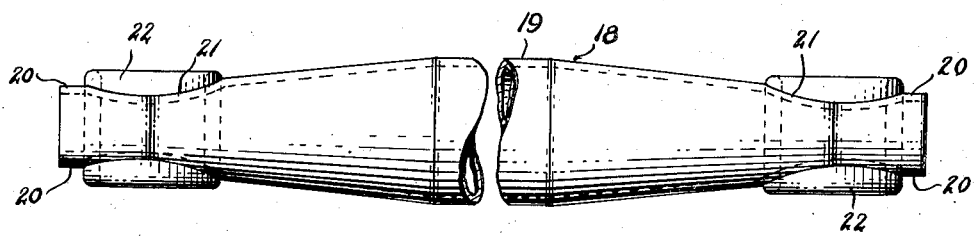
Figure 3 is a plan view of the strut.
Figure 4:
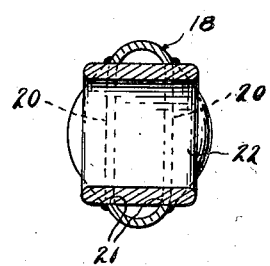
Figure 4 is a cross sectional view taken substantially on the plane indicated by the line 4—4 of Figure 2.

Although the connecting link or strut forming the subject matter of this invention may be used in practically all cases where it is desired to connect two parts together, nevertheless, in the specific embodiment of the invention I have shown the strut as installed on a motor vehicle in a manner to stabilize the action of the unsprung weight. With this in mind, reference will now be made to the accompanying drawing, wherein a portion of a motor vehicle is illustrated in Figure 1 having an unsprung assembly 11 and a sprung assembly 12 supported on the unsprung assembly by means of suspension springs 13. In the present instance, the unsprung assembly 11 is shown as comprising a driving axle 14 and road engaging wheels 15 carried by the axle 14 at opposite ends thereof. The sprung assembly 12 is illustrated as comprising a chassis frame having the usual laterally spaced sills 16 at opposite sides of the vehicle and adapted to support the body (not shown) of the vehicle. In the interests of simplicity, the suspension springs 13 are indicated as being of the semi-elliptical type located at opposite sides of the vehicle with the extremities thereof pivotally connected to the adjacent side sills of the chassis frame and having the central portions clamped, or otherwise suitably secured to the axle 14.

In vehicles of the type wherein the sprung assembly is supported on the unsprung assembly through the medium of suspension springs, there is a tendency for one of the assemblies to shift sidewise relative to the other under certain driving conditions, and it has been proposed to minimize this movement by connecting the sprung assembly to the unsprung assembly with a stabilizing strut 18. In actual practice, one end of the strut is connected to the unsprung assembly at one side of the latter for pivotal movement in a vertical plane and the opposite end of the strut is similarly connected to the unsprung assembly adjacent the opposite side of the latter. The construction of the strut must be such that it not only effectively withstands the relatively high stresses resulting from tension, compression, and torque, but must also be light in weight and inexpensive to manufacture. The strut forming the subject matter of this invention possesses all of these advantageous features and will now be described.

In detail the strut 18 comprises an elongated body 19 substantially tubular in cross section and having the opposite end portions flattened to some extent to provide each of the end portions with laterally spaced opposed walls 20 elongated in a direction extending transversely to the axis of the body 19. The walls 20 are formed with aligned openings 21 therethrough, and a bushing 22 is sleeved in the openings at each end of the body 19. The axis of each bushing, of course, extends transversely to the axis of the body 19 and the opposite ends of the bushings project beyond the side walls 20 to such an extent as to permit welding both ends of each bushing to the body portion 19 of the strut. As a result, the bushings 22 are integrally connected with the body 19 of the strut and form an assembly with the latter.

With the above construction, it will be noted that the opposite ends of each bushing are effectively supported by the laterally spaced substantially flat walls 20 at opposite ends of the strut and that any stresses applied to the bushings 22 are transferred to the tubular strut through these walls. As a result of this construction, both the body portion 19 of the strut and the bushings 22 may be either rolled from sheet metal or formed of seamless tubing with the result that the construction is not only extremely light, but possesses sufficient strength to withstand considerable stress resulting from any tension, compression, or torque transmitted to the strut. Also, in view of the fact that the flattened ends are elongated in a direction extending transversely of the strut, it follows that the width of these ends exceeds the diameter of the strut intermediate the ends of the latter and, as a consequence, bushings may be used having a diameter relatively large as compared to the diameter of the intermediate portion of the strut.

In actual practice, the opposite ends of the strut are respectively pivotally connected to the brackets 23 and 24 respectively secured to the sprung and unsprung weight of the vehicle. The pivotal connections may be in the form of pins 25 anchored to the brackets and extending through the bushings 22. Suitable rubber grommets are provided to insulate the pins from the bushings and thereby eliminate any possibility of noise during operation of the vehicle.

What I claim as my invention is:

1. A strut comprising a sheet metal tubular body having one end flattened to form said end with opposed walls elongated in a direction extending transversely to the axis of the body and provided with aligned openings, and a sheet metal tube in the form of a bushing sleeved in the openings and having the opposite ends integrally secured to the opposed walls.

2. A strut comprising an elongated tubular body having the opposite end portions flattened to form each of said ends with opposed laterally spaced walls elongated in a direction extending transversely to the axis of the body and provided with aligned openings therethrough, and a bushing sleeved in the openings in each end of the body and having the opposite ends welded to said walls.

JOHN M. NICKELSEN.